United States Patent
Graham et al.

(10) Patent No.: US 10,873,204 B2
(45) Date of Patent: Dec. 22, 2020

(54) INDUCTIVE COUPLING ASSEMBLY FOR AN ELECTRONIC DEVICE

(71) Applicant: Apple Inc., Cupertino, CA (US)

(72) Inventors: Christopher S. Graham, San Francisco, CA (US); Ibuki Kamei, San Jose, CA (US); Timothy J. Rasmussen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 16/058,858

(22) Filed: Aug. 8, 2018

(65) Prior Publication Data
US 2018/0351393 A1    Dec. 6, 2018

Related U.S. Application Data

(63) Continuation of application No. 14/861,764, filed on Sep. 22, 2015, now abandoned.
(Continued)

(51) Int. Cl.
*H02J 7/00* (2006.01)
*H02J 7/02* (2016.01)
(Continued)

(52) U.S. Cl.
CPC .............. *H02J 7/025* (2013.01); *H01F 38/14* (2013.01); *H02J 7/0042* (2013.01); *H02J 7/04* (2013.01); *H02J 50/10* (2016.02)

(58) Field of Classification Search
CPC .. H02J 7/025; H02J 7/0042; H02J 7/04; H02J 50/10; H02J 50/40; H02J 50/402; H02J 50/50; H02J 50/502; H01F 38/14
(Continued)

(56) References Cited

U.S. PATENT DOCUMENTS

| | | |
|---|---|---|
| 4,612,467 A | 9/1986 | Clegg |
| 5,198,647 A | 3/1993 | Mizuta |

(Continued)

FOREIGN PATENT DOCUMENTS

| | | |
|---|---|---|
| CN | 101867203 | 10/2010 |
| CN | 102377250 | 3/2012 |

(Continued)

OTHER PUBLICATIONS

CN201590000911.2, "Notice of Decision to Grant," dated Apr. 27, 2018, 2 pages.
(Continued)

*Primary Examiner* — Nathaniel R Pelton
(74) *Attorney, Agent, or Firm* — Kilpatrick Townsend & Stockton LLP

(57) ABSTRACT

An inductive coupling assembly for an electronic device is disclosed. The system may include an electronic device having an enclosure, and an internal inductive charging assembly positioned within the enclosure. The internal inductive charging assembly may include a receive inductive coil positioned within the enclosure. The system may also include a charger in electrical communication with the internal inductive charging assembly of the electronic device. The charger may include a transmit inductive coil aligned with the receive inductive coil. The transmit inductive coil may be configured to be in electrical communication with the receive inductive coil. Additionally, the system can include an inductive coupling assembly positioned between the electronic device and the charger. The inductive coupling assembly may include a field-directing component configured to be in electrical communication with the transmit inductive coil, and/or the receive inductive coil of the internal inductive charging assembly of the electronic device.

20 Claims, 13 Drawing Sheets

Related U.S. Application Data

(60) Provisional application No. 62/056,789, filed on Sep. 29, 2014.

(51) Int. Cl.
*H02J 7/04* (2006.01)
*H01F 38/14* (2006.01)
*H02J 50/10* (2016.01)

(58) Field of Classification Search
USPC ........................................................ 320/108
See application file for complete search history.

(56) References Cited

U.S. PATENT DOCUMENTS

| | | | |
|---|---|---|---|
| 5,305,961 A | 4/1994 | Bourgeon et al. |
| 5,719,483 A | 2/1998 | Abbott et al. |
| 6,975,198 B2 | 12/2005 | Baarman et al. |
| 7,180,265 B2 | 2/2007 | Naskali et al. |
| 7,477,128 B2 | 1/2009 | Quilici et al. |
| 7,830,116 B2 | 11/2010 | Toya et al. |
| 7,948,208 B2 | 5/2011 | Partovi et al. |
| 7,952,322 B2 | 5/2011 | Partovi et al. |
| 8,169,185 B2 | 5/2012 | Partovi et al. |
| 8,193,769 B2 | 6/2012 | Azancot et al. |
| 8,229,356 B2 | 7/2012 | Kawamura |
| 8,406,823 B2 | 3/2013 | Kondo et al. |
| 8,421,574 B2 | 4/2013 | Suzuki et al. |
| 8,482,160 B2 | 7/2013 | Johnson et al. |
| 8,587,516 B2 | 11/2013 | Kopychev et al. |
| 8,629,652 B2 | 1/2014 | Partovi et al. |
| 8,629,654 B2 | 1/2014 | Partovi et al. |
| 8,643,461 B2 | 2/2014 | Lim et al. |
| 8,754,609 B2 | 6/2014 | Tsai et al. |
| 8,760,255 B2 | 6/2014 | Yang et al. |
| 8,796,989 B2 | 8/2014 | Park et al. |
| 8,844,817 B2 | 9/2014 | Glanzer et al. |
| 8,845,590 B2 | 9/2014 | Ash |
| 8,890,369 B2 | 11/2014 | Baarman et al. |
| 8,890,470 B2 | 11/2014 | Partovi |
| 8,896,264 B2 | 11/2014 | Partovi |
| 8,901,881 B2 | 12/2014 | Partovi |
| 8,912,686 B2 | 12/2014 | Stoner, Jr. et al. |
| 8,922,065 B2 | 12/2014 | Sun et al. |
| 8,922,162 B2 | 12/2014 | Park et al. |
| 8,947,041 B2 | 2/2015 | Cook et al. |
| 8,947,042 B2 | 2/2015 | Kirby et al. |
| 8,947,047 B2 | 2/2015 | Partovi |
| 9,054,417 B2 | 6/2015 | Lin |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,118,193 B2 | 8/2015 | Yeh |
| 9,124,308 B2 | 9/2015 | Metcalf et al. |
| 9,130,408 B2 | 9/2015 | Ichikawa |
| 9,160,204 B2 | 10/2015 | Yeh |
| 9,178,369 B2 | 11/2015 | Partovi |
| 9,190,849 B2 | 11/2015 | Won et al. |
| 9,246,214 B2 | 1/2016 | Pope et al. |
| 2005/0288743 A1 | 12/2005 | Ahn et al. |
| 2006/0049481 A1 | 3/2006 | Tiemeijer et al. |
| 2007/0182367 A1 | 8/2007 | Partovi et al. |
| 2010/0253153 A1* | 10/2010 | Kondo .................... H01F 38/14 307/104 |
| 2011/0050164 A1 | 3/2011 | Partovi et al. |
| 2011/0143556 A1 | 6/2011 | Hsu et al. |
| 2011/0221385 A1 | 9/2011 | Partovi et al. |
| 2012/0098484 A1 | 4/2012 | Cheng et al. |
| 2012/0235636 A1 | 9/2012 | Partovi |
| 2013/0026981 A1 | 1/2013 | Van Der Lee et al. |
| 2013/0069595 A1 | 3/2013 | Rejman et al. |
| 2013/0093388 A1 | 4/2013 | Partovi |
| 2013/0099563 A1 | 4/2013 | Partovi et al. |
| 2013/0107126 A1 | 5/2013 | Nonomura et al. |
| 2013/0119926 A1 | 5/2013 | Lin et al. |
| 2013/0127252 A1* | 5/2013 | Yerazunis ............... H02J 50/12 307/104 |
| 2013/0127406 A1 | 5/2013 | Winger et al. |
| 2013/0249479 A1 | 9/2013 | Partovi |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2013/0320873 A1 | 12/2013 | Tang et al. |
| 2014/0021909 A1 | 1/2014 | Klawon et al. |
| 2014/0065948 A1* | 3/2014 | Huang ................. H04B 1/3888 455/7 |
| 2014/0083997 A1 | 3/2014 | Chen et al. |
| 2014/0091756 A1 | 4/2014 | Ofstein et al. |
| 2014/0103873 A1 | 4/2014 | Partovi et al. |
| 2014/0132210 A1 | 5/2014 | Partovi |
| 2014/0191568 A1 | 7/2014 | Partovi |
| 2014/0206372 A1 | 7/2014 | Zeng et al. |
| 2014/0265617 A1 | 9/2014 | Roy et al. |
| 2014/0306654 A1 | 10/2014 | Partovi |
| 2015/0130412 A1 | 5/2015 | Partovi |
| 2015/0145475 A1 | 5/2015 | Partovi et al. |
| 2015/0287527 A1 | 10/2015 | Kasar |
| 2015/0302971 A1 | 10/2015 | Wagman et al. |
| 2015/0311740 A1 | 10/2015 | Hilario et al. |
| 2016/0064137 A1 | 3/2016 | Perez et al. |
| 2016/0094076 A1 | 3/2016 | Kasar et al. |
| 2016/0094078 A1 | 3/2016 | Graham et al. |

FOREIGN PATENT DOCUMENTS

| | | |
|---|---|---|
| CN | 102386639 | 3/2012 |
| CN | 103168405 | 6/2013 |
| CN | 103248094 | 8/2013 |
| CN | 103378639 | 10/2013 |
| CN | 103633746 | 3/2014 |
| CN | 207603236 | 7/2018 |
| EP | 2535906 | 12/2012 |
| EP | 2597747 | 5/2013 |
| EP | 2621050 | 7/2013 |
| EP | 2693591 | 2/2014 |
| FR | 2883428 | 9/2006 |
| JP | 58087804 | 5/1983 |
| JP | 08079976 | 3/1996 |
| JP | 2008210862 | 9/2008 |
| WO | 03105311 | 12/2003 |
| WO | 2013165167 | 11/2013 |
| WO | 2016053707 | 4/2016 |

OTHER PUBLICATIONS

PCT/US2015/051629, "International Search Report and Written Opinion," dated Feb. 15, 2016, 15 pages.
PCT/US2015/051629, "Invitation to Pay Additional Fees," Dec. 9, 2015, 7 pages.
U.S. Appl. No. 14/861,764, Final Office Action, dated Feb. 23, 2018, 11 pages.
U.S. Appl. No. 14/861,764, Non-Final Office Action, dated Aug. 17, 2017, 11 pages.
China Patent Application No. 201590000911.2 , "Utility Model Patentability Evaluation Report", dated Sep. 20, 2018, 19 pages.

\* cited by examiner

INDUCTIVE COUPLING ASSEMBLY FOR AN ELECTRONIC DEVICE

CROSS-REFERENCES TO RELATED APPLICATIONS

This application is a continuation of U.S. patent application Ser. No. 14/861,764 with is a non-provisional patent application of and claims the benefit to U.S. Provisional Patent Application No. 62/056,789, filed Sep. 29, 2014 and titled "Inductive Charging Systems for Electronic Devices," the disclosure of which is hereby incorporated herein by reference in its entirety.

FIELD

The disclosure relates generally to electronic devices and, more particularly to inductive coupling assemblies positioned within an enclosure of the electronic device and inductive coupling assemblies positioned in a protective case positioned around at least a portion of the electronic device.

BACKGROUND

Many electronic devices include one or more rechargeable batteries that require external power to recharge. Often, these devices may be charged using the same or similar connection type; for example, via universal serial bus ("USB") or other electrical connections. Electrical connection types may vary, and multiple devices often require separate power supplies with different power outputs. These separate power supplies are burdensome to use, store, and transport from place to place.

SUMMARY

Some example embodiments are directed to a system that includes an electronic device comprising an enclosure and an internal inductive charging assembly positioned within the enclosure. The internal inductive charging assembly comprises a receive inductive coil positioned within the enclosure. The system also comprises a charger in electrical communication with the internal inductive charging assembly of the electronic device. The charger comprises a transmit inductive coil aligned with the receive inductive coil. The transmit inductive coil is configured to be in electrical communication with the receive inductive coil of the electronic device. Additionally, the system comprises an inductive coupling assembly positioned between the electronic device and the charger. The inductive coupling assembly comprises a field-directing component configured to be in electrical communication with at least one of the transmit inductive coil of the charger, or the receive inductive coil of the internal inductive charging assembly of the electronic device.

An electronic device is disclosed. The electronic device comprises an enclosure and an internal inductive charging assembly positioned within the enclosure. The internal inductive charging assembly comprises a receive inductive coil positioned within the enclosure. The electronic device also comprises an inductive coupling assembly embedded within the enclosure, adjacent the internal inductive charging assembly. The inductive coupling assembly embedded within the enclosure comprises an alignment component, and a field-directing component surrounding the alignment component. The field-directing component is aligned with the receive inductive coil of the internal inductive coupling assembly.

A protective case coupled to an electronic device is disclosed. The protective case comprises a body and an inductive coupling assembly positioned at least partially within the body. The inductive coupling assembly comprises an alignment component and a field-directing component surrounding the alignment component. The field-directing component is operatively configured to be aligned with and in electrical communication with a receive inductive coil of the electronic device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
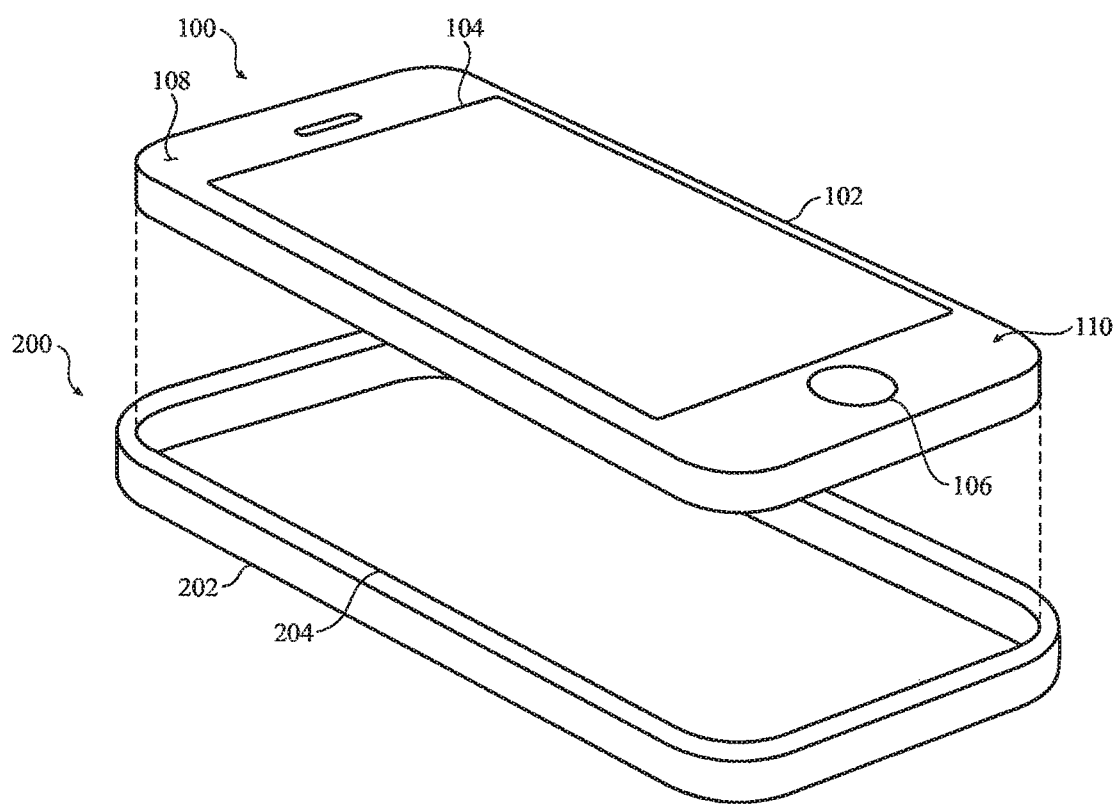
FIG. 1A shows an exploded view of an electronic device and a protective case, according to embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices and, more particularly, to inductive coupling assemblies formed or positioned within an enclosure of the electronic device and inductive coupling assemblies positioned in a protective case positioned around a portion of the electronic device.

As discussed herein, electronic devices include an inductive coupling assembly. The user may place the device on an inductive charging surface in order for the battery to be recharged. However, in order to produce the most efficient and/or effective charge between the device and the inductive charging surface, the transmitting component of the inductive charging surface should be aligned with the receiving component in the electronic device. Where the alignment between the inductive charging components is off, the efficiency in the inductive coupling to the electronic device may be substantially reduced.

Additionally, as the distance between the transmitting component of the inductive charging surface and the receiving component in the electronic device increases, the efficiency and/or effectiveness of the transmitted power decreases. As a result, it may be beneficial to place the electronic device directly on the inductive charging surface. Where an intermediate layer or component, such as a cover or auxiliary case, is positioned between the electronic device and the charging surface, the efficiency of charging the electronic device may be reduced.

In a particular embodiment, an enclosure for an electronic device or, alternatively, an auxiliary protective case surrounding the electronic device, includes an inductive coupling assembly to improve inductive coupling for wirelessly charging a battery of the electronic device. The inductive coupling assembly may be formed directly in the enclosure of the electronic device or may be positioned in a back portion of the protective case, in alignment with an internal inductive charging assembly of the electronic device. The inductive coupling assembly positioned in the enclosure or the protective case acts as an intermediate inductive coupling assembly, which may redirect or repeat the inductive power supplied from a separate charger to the internal charging assembly of the electronic device. The inductive coupling assembly may reduce or minimize the amount of power that is lost between the charger and the internal inductive charging assembly. Additionally, the effect of a gap or distance between the charger and the internal inductive charging assembly may be reduced or minimized. When wirelessly charging the electronic device, the intermediate inductive coupling assembly may redirect or repeat the inductive power supplied from the charger to the device. This function of the inductive coupling assembly may improve the efficiency of power transmission between the charger and the electronic device, which may result in faster charging times and reduce wasted power.

In some implementations, the inductive coupling assembly includes an alignment component and a field-directing component surrounding the alignment component. The alignment component may be used to align or locate the charger with respect to the electronic device. The inductive coupling assembly aids in the power transmission as a result of the field-directing component redirecting or repeating the inductive field from a transmit inductive coil of a charger to a receive inductive coil of the electronic device. Additionally, the inductive coupling assembly aids in power transmission where the field-directing component provides an intermediate inductive field transmitter or repeater between the transmit inductive coil of the charger and the receive inductive coil of the electronic device. The intermediate inductive field transmitter or repeater strengthens, increases, and/or improves the power transmitted through components such as a case or an enclosure of the electronic device prior to the power reaching the receive inductive coil of the electronic device. The alignment component also aids in power transmission by aligning the field-directing component with the transmit inductive coil of the charger and the receive inductive coil of the electronic device, respectively.

These and other embodiments are discussed below with reference to FIGS. 1A-13. However, those skilled in the art will readily appreciate that the detailed description given herein with respect to these Figures is for explanatory purposes only and should not be construed as limiting.

Figure 1B:
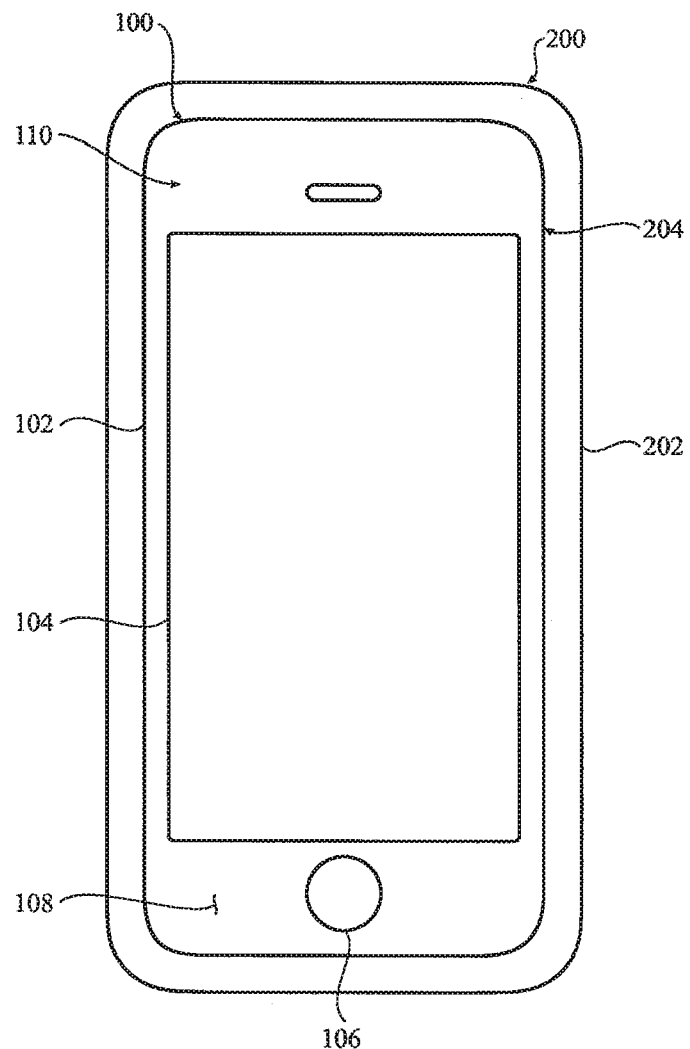
FIG. 1B shows a front view of the electronic device and the protective case of FIG. 1A, according to embodiments.
Figure 1C:
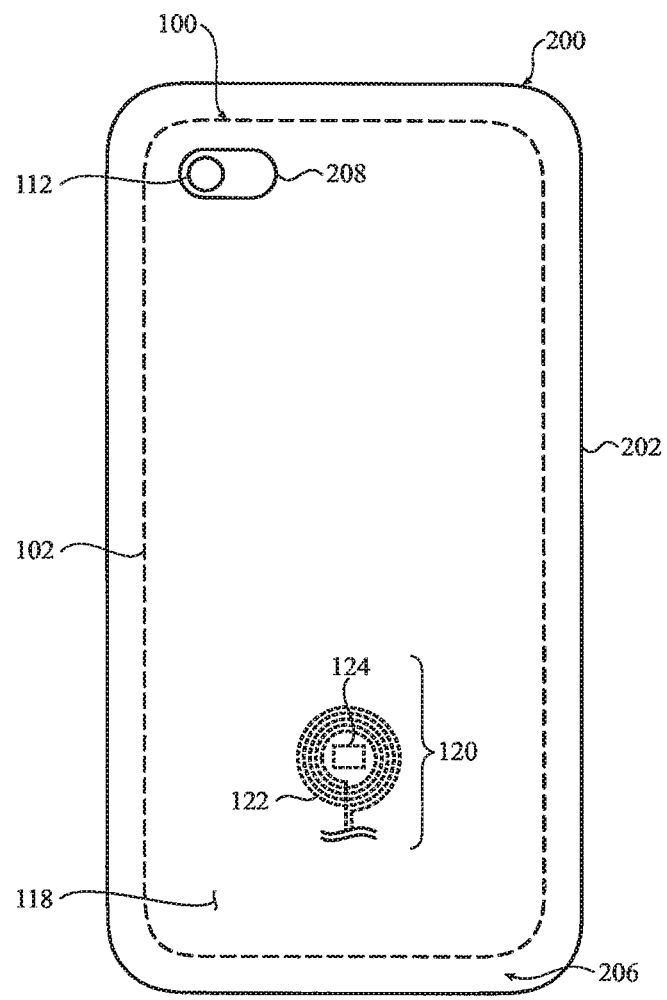
FIG. 1C shows a back view of the electronic device and the protective case of FIG. 1A, according to embodiments.

FIGS. 1A-1C show one example of an electronic device. The electronic device 100 includes a battery (510 of FIG. 13) for supplying power to the device 100 and an internal inductive charging assembly 120 positioned within the electronic device 100 (FIG. 1C). The internal inductive charging assembly 120 is configured to interact with a charger or charging source to recharge the battery of the electronic device 100. To improve charging efficiency and/or decrease charging time (e.g., duration of time to achieve a full battery or "100%" battery life) for the electronic device 100, the internal inductive charging assembly 120 discussed herein includes an alignment component, such as a magnet 124, and a power receive inductive coil 122.

As discussed herein, the electronic device 100 can utilize and/or interact with an inductive coupling assembly (see, FIGS. 5-12) positioned within the enclosure 102 of the electronic device 100, or alternatively, within a protective case 200 surrounding the electronic device 100. The inductive coupling assembly can includes an alignment component and a field-directing component surrounding the alignment component. As discussed herein, the inductive coupling assembly redirects the power or inductive field supplied from a charger to the electronic device 100. By redirecting or repeating the power or inductive field supplied by the charger, minimal amounts of power or inductive field may be lost due to "leakage" as the power travels from the charger to the electronic device 100. As a result, the efficiency of charging the electronic device 100 may be improved and/or the charging time is decreased.

As shown in FIGS. 1A-1C, electronic device 100 is implemented as a mobile telephone. However, it is understood that other embodiments can implement electronic device 100 differently, such as, for example, as a laptop or desktop computer, a tablet computing device, a gaming device, a display, a digital music player, a wearable computing device or display, a health monitoring device, and so on.

Electronic device 100 includes an enclosure 102 at least partially surrounding a display 104 and one or more buttons 106 or input devices formed or positioned on a front surface 108 of electronic device 100. (Reference herein to a "button" generally is intended to encompass any suitable form of input element, including switches, toggles, sliders, touch screens, and the like.) Enclosure 102 can form an outer surface or partial outer surface and protective case for the internal components of the electronic device 100 and may at least partially surround display 104. Enclosure 102 can be formed of one or more components operably connected together, such as a front piece and a back piece. Alternatively, enclosure 102 can be formed of a single piece operably connected to display 104. Additionally, enclosure 102 may be formed from a variety of material including, but not limited to: reinforced glass, plastic, metal, artificially grown corundum, and any combination of material. Enclosure 102 may also include an opaque frame 110 substantially surrounding and/or outlining display 104. Frame 110 of enclosure 102 may surround display 104 to indicate the interactive display 104 of electronic device 100. Frame 110 may not be a distinct component but rather may be a darkened or painted portion of a cover glass covering and protecting display 104, which may visually aid a user to identify the area of electronic device 100 that includes interactive display 104.

As shown in FIGS. 1A-1C, electronic device 100 may be positioned within a protective case 200. A body 202 of protective case 200 may be coupled to and/or substantially surround electronic device 100 such that the majority of enclosure 102 of electronic device 100 is positioned within protective case 200. As shown in FIGS. 1A-1C, body 202 of protective case 200 may substantially surround the majority of enclosure 102 of electronic device 100 except for display 104 and other portions of electronic device 100, as discussed herein. The illustrated size of protective case 200 may vary between embodiments. Body 202 of protective case 200 can form an additional or auxiliary protective case to enclosure 102 of electronic device 100 to protect electronic device 100 and its components (e.g., display 104, button 106, and other components).

Body 202 can be formed of one or more components operably connected together, such as a front piece and a back piece. Alternatively, body 202 of protective case 200 can be formed of a single piece capable of being coupled to electronic device 100. Body 202 may be coupled to electronic device 100 using any suitable technique including, but not limited to, a compression fit, retention fit, snap fit of two-piece enclosure that joins together to hold the device and so on. Additionally, in some embodiments body 202 of protective case 200 may be formed from a substantially flexible and/or resilient material that may protect electronic device 100 from damage and/or exposure to contaminants. In a non-limiting example, body 202 may be formed from a polymer rubber. Body 202 may be semi-rigid or rigid in other embodiments, or may be rigid in certain regions and flexible in others.

Body 202 may have a front opening 204 formed therein to expose display 104 and button 106 of electronic device 100, although this is not required and some bodies may enclose one or both of display and button. As shown in FIG. 1B, front opening 204 may be larger than display 104 but smaller than enclosure 102 of electronic device 100. Front opening 204 may be larger than display 104, and the area including button 106 may ensure that display 104 and button 106 are not obstructed or blocked from a user of electronic device 100. Additionally, by including front opening 204 of body 202 being smaller than enclosure 102, electronic device 100 may be coupled to and/or remain within body 202 of protective case 200 during use of electronic device 100.

FIG. 1C shows a back view of electronic device 100 and protective case 200. Electronic device 100 may include an internal inductive charging assembly 120 (shown in phantom). Internal inductive charging assembly 120 may be positioned within enclosure 102 of electronic device 100 and may be positioned substantially adjacent and/or parallel to back wall 118 of electronic device 100, as discussed herein. As discussed below in detail, internal inductive charging assembly 120 is in electrical communication with a battery (see, FIG. 13) of electronic device 100 and is configured to receive power from a charger (see, FIG. 2) for charging the battery of electronic device 100. Additionally as discussed herein, the charger provides power through enclosure 102 of electronic device 100 such that internal inductive charging assembly 120 inductively charges the battery of electronic device 100.

As shown in FIG. 1C, internal inductive charging assembly 120 may include at least one receive inductive coil 122 (shown in phantom) positioned within enclosure 102. Receive inductive coil 122 may be positioned within the enclosure 102 and may not be exposed outside of enclosure 102 of electronic device 100 although, in some embodiments, at least a portion of receive inductive coil 122 may be externally accessible or exposed. Receive inductive coil 122 may receive power from a distinct source or device and, in certain circumstances and embodiments, may also transmit power.

As discussed herein, receive inductive coil 122 may be in electrical communication with a transmit inductive coil of a charger for electronic device 100 for receiving power when suitably aligned and the charger is active. The phantom circle representing receive inductive coil 122 in FIG. 1C is one example of a sample location where receive inductive coil 122 may be positioned within electronic device 100.

In a non-limiting example as shown in FIG. 1C, receive inductive coil 122 may be formed from a wire or other suitable conductive element that may be configured to form a plurality of concentric loops or converging, spiraling circles. The wire forming receive inductive coil 122 may be formed from any suitable conductive material including, but not limited to, metals, conductive polymers, conductive composites and the like. However, it is understood that inductive coil 122 of electronic device 100 may be formed from any suitable material and may be configured in a variety of geometries to allow the transfer of power to electronic device 100, as discussed herein. Further, the size, shape, spacing and/or location of receive inductive coil 122 and constituent loops may vary between embodiments.

Internal inductive charging assembly 120 of electronic device 100 may also include at least one alignment magnet 124 positioned adjacent to receive inductive coil 122, although this is not required. As shown in FIG. 1C, an alignment magnet 124 may be positioned within the center of receive inductive coil 122, such that the wires of receive inductive coil 122 substantially surround alignment magnet 124 of electronic device 100. As discussed herein, receive inductive coil 122 and alignment magnet 124 may also be substantially aligned in a common plane. Alignment magnets 124 of electronic device 100 may be utilized to align receive inductive coil 122 with a charger of electronic device 100 for transmitting power between receive inductive coil 122 and the charger, as discussed herein. Alignment magnets 124 may be formed from any suitable material that may include magnetic properties.

In some embodiments, the alignment magnet 124 may be an electromagnet and thus only emit a magnetic field when powered. This may be useful to prevent unwanted magnetic interference or adhesion during non-charging operation, but facilitate alignment while charging or shortly before charging. In some embodiments, the alignment magnet 124 may be powered when an inductive charger is sensed in near proximity. As one non-limiting example, a trickle current induced in the receive inductive coil 122 or a suitable electronic circuit by the presence of an inductive charge may initiate power to the alignment magnet. In other embodiments, periodic polling may take place by the electronic device 100 to determine if an inductive charger is near; a response to the polling indicating the presence of an inductive charger may initiate power to the alignment magnet.

Electronic device 100 may also include a battery (see, FIG. 13) positioned within enclosure 102. The battery may be positioned within enclosure 102 and may be in electrical communication with receive inductive coil 122 of electronic device 100. As discussed herein, receive inductive coil 122 may be in electrical communication with the battery to transmit power to the battery to increase the charge of the battery. The battery may be utilized to power electronic device 100 and/or provide a power source for inductively transmitting power from receive inductive coil 122 to another device or coil.

Electronic device 100 may have a camera 112 positioned on back wall 118. That is, camera 112 may be positioned on back wall 118, opposite front surface 108 having display 104 of electronic device 100. Camera 112 may include any suitable camera device and/or system that may take photos and/or videos using electronic device 100.

Body 202 of protective case 200 may cover almost all of back wall 118 of electronic device 100. As shown in FIG. 1C, a back portion 206 of body 202 may be positioned adjacent to, coupled to and/or may substantially cover, back wall 118 of electronic device 100. A back opening 208 may be formed through back portion 206 of body 202 to expose and/or prevent obstruction of camera 112 of electronic device 100.

Figure 2:
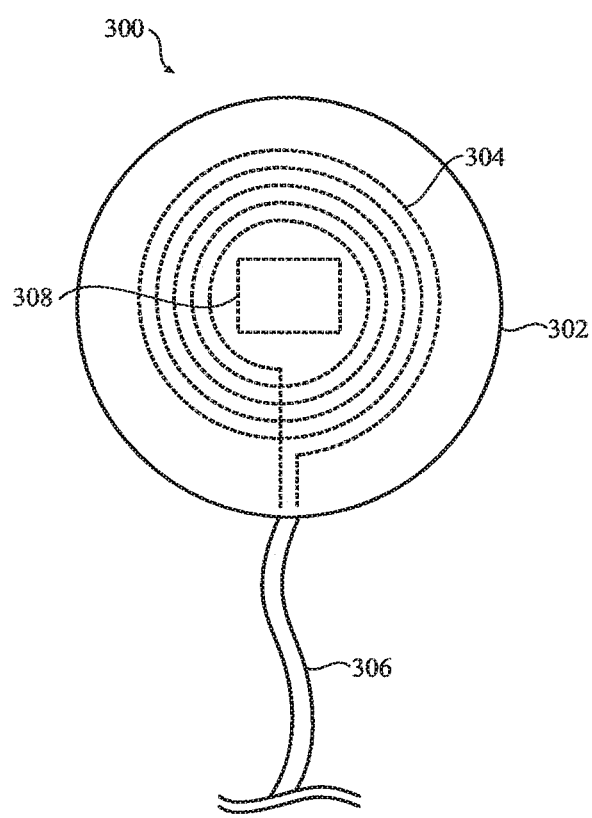
FIG. 2 shows a top view of a charger for the electronic device, according to embodiments.

FIG. 2 shows a top view of a charger 300 for electronic device 100 (such as is shown in FIGS. 1A-1C). Charger 300 is configured to receive electric power from a wall outlet or other power source and provide the power to electronic device 100, as discussed herein. In some embodiments, charger 300 has a contact plate 302 that contacts enclosure 102 of electronic device 100 and/or body 202 of protective case 200 when charging electronic device 100. Contact plate 302 may also house and/or protect a plurality of internal components of charger 300. As shown in FIG. 2, a transmit inductive coil 304 (shown in phantom) may be positioned or housed within contact plate 302. Thus, it is not necessary that contact plate 302 is itself directly electrically conductive as power may be inductively transferred through the plate between receive inductive coil 122 and transmit inductive coil 304.

Transmit inductive coil 304 of charger 300 may be configured and/or formed from substantially similar material as receive inductive coil 122 of electronic device 100. However, transmit inductive coil 304 may provide a distinct function. For example, transmit inductive coil 304 may be a transmit coil that may transmit or provide power to receive inductive coil 122, as discussed herein. The power transmitted by transmit inductive coil 304 may be provided or supplied by power cord 306 in electrical communication with transmit inductive coil 304, where power cord 306 is configured to interact and/or receive power from a wall outlet or other power source.

Charger 300 may also include at least one alignment magnet 308 (shown in phantom) positioned adjacent to transmit inductive coil 304. As shown in FIG. 2, an alignment magnet 308 may be positioned within the center of transmit inductive coil 304, such that the wires of transmit inductive coil 304 substantially surround alignment magnet 308 of charger 300. Transmit inductive coil 304 and alignment magnet 308 may also be substantially aligned along a common surface of contact plate 302. Alignment magnets 308 of charger 300 may be utilized to align transmit inductive coil 304 with electronic device 100 (see, FIGS. 1A-1C) for transmitting power between transmit inductive coil 304 and electronic device 100 (see, FIGS. 1A-1C), as discussed herein. As the surface of electronic device 100 comes near the surface of charger 300, the alignment magnets 308 in charger 300 and alignment magnet 124 in electronic device 100 (or case) may move the device 100 (or case) with respect to charger 300, or vice versa. The magnetic field between alignment magnets 124, 308 is strongest when the two are directly opposite one another, and the magnetic field may operate to locate the device and charger accordingly. This may likewise align the coils 122, 304 with respect to one another in such a fashion that inductive power transfer is enhanced or maximized. Alignment magnets 308 may be formed from any suitable material.

Figure 3:
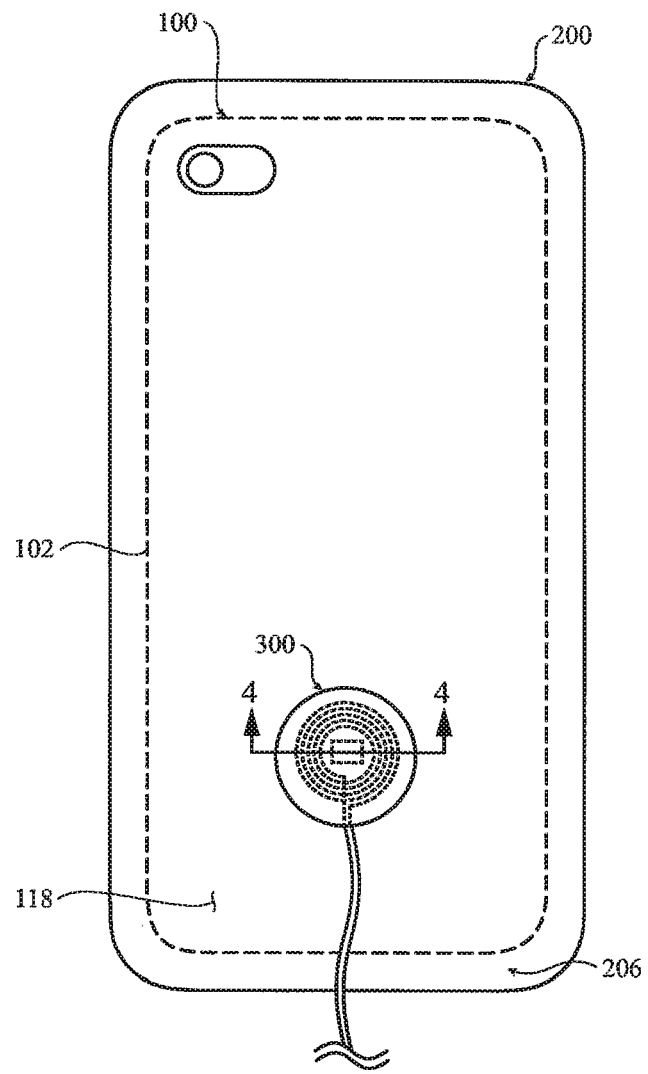
FIG. 3 shows a back view of the electronic device and the protective case of FIG. 1A and the charger of FIG. 2, according to embodiments.

FIG. 3 shows a back view of charger 300 positioned on protective case 200. Charger 300 may be positioned on back portion 206 of protective case 200 to provide power to electronic device 100, and charge the battery (not shown) of electronic device 100. As shown in FIG. 3, contact plate 302 of charger 300 may contact back portion 206 of protective case 200 adjacent to back wall 118 of enclosure 102 when providing power to electronic device 100. As discussed herein, charger 300 may be in electrical communication with internal inductive charging assembly 120 (see, FIG. 1C) of electronic device 100 to provide power through protective case 200 to electronic device 100.

Figure 4:
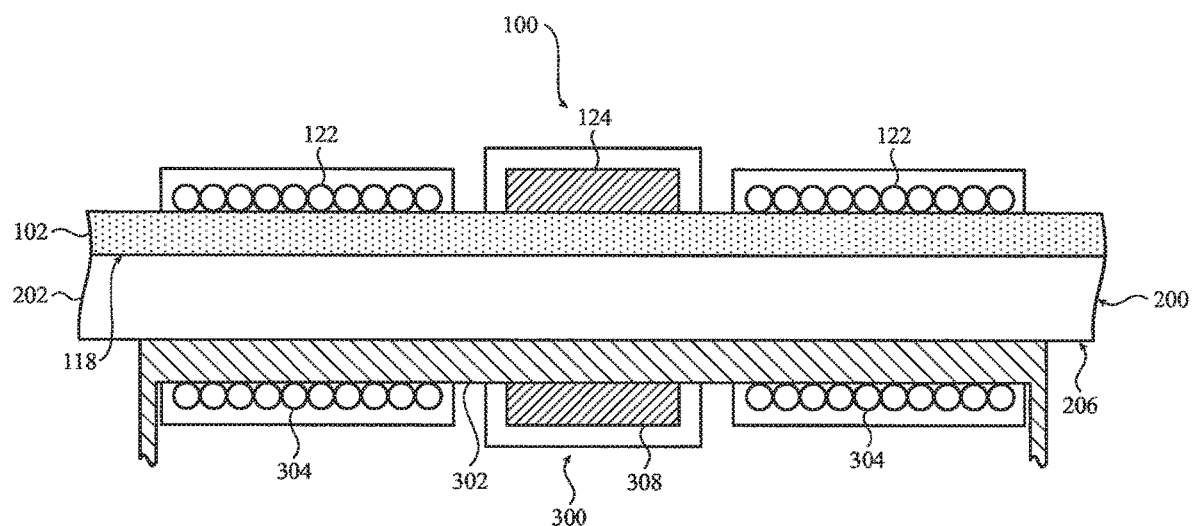
FIG. 4 shows a cross-sectional view of a portion of the electronic device, the protective case and the charger, taken along line 4-4 in FIG. 3, according to embodiments.

FIG. 4 shows a side cross-sectional view of charger 300 positioned on back portion 206 of protective case 200 for providing power to electronic device 100. As shown in FIG. 4, contact plate 302 may be positioned on back portion 206 of protective case 200, adjacent to back wall 118 of enclosure 102 of electronic device 100. Contact plate 302 may also be coupled to protective case 200 and/or electronic device 100 as a result of the magnetic attraction between alignment magnet 124 of electronic device 100 and alignment magnet 308 of charger 300. The magnetic attraction formed between alignment magnet 124 of electronic device 100 and alignment magnet 308 of charger 300 may pass through protective case 200 and may couple contact plate 302 of charger 300 to protective case 200 and/or electronic device 100.

In addition to coupling charger 300 to protective case 200 and/or electronic device 100, alignment magnet 124 of electronic device 100 may be substantially aligned with (or may facilitate substantial alignment with) alignment magnet 308 of charger 300 when contact plate 302 contacts back portion 206 of protective case 200. As a result, receive inductive coil 122 of electronic device 100 may be in substantial alignment with transmit inductive coil 304 of charger 300. By aligning receive inductive coil 122 and transmit inductive coil 304 using alignment magnets 124, 308, power may be more effectively transmitted from transmit inductive coil 304, through protective case 200 and enclosure 102, to receive inductive coil 122, for charging the battery (not shown) of electronic device 100.

An inductive coupling assembly 400 (see, FIGS. 5-12) can also be positioned between the internal inductive charging assembly 120 (e.g., receive inductive coil 122, alignment magnet 124) of electronic device 100 and charger 300. In non-limiting examples discussed in detail below, inductive coupling assembly 400 may be positioned within protective case 200 (see, FIG. 5-8) or within enclosure 102 of electronic device 100 (see, FIG. 12). Additionally as discussed herein, inductive coupling assembly 400 is positioned between the internal inductive charging assembly of electronic device 100 and charger 300 to redirect or repeat the inductive field from transmit inductive coil 304 of charger 300 to receive inductive coil 122 of electronic device 100.

FIGS. 5-8 show cross-sectional side views of additional, non-limiting examples of protective case 200 having an inductive coupling assembly 400. That is, FIGS. 5-8 show additional, non-limiting examples of protective case 200 having an inductive coupling assembly 400 formed or positioned within body 202. It is understood that similarly numbered and/or named components may function in a substantially similar fashion. Redundant explanation of these components has been omitted for clarity.

As shown in FIGS. 5-8, inductive coupling assembly 400 may include an alignment component 402a, 402b, and a field-directing component 404a, 404b surrounding alignment component 402a, 402b. As shown in FIGS. 5-8, the alignment component 402a, 402b and field-directing component 404a, 404b may be positioned within body 202 of protective case 200, such that alignment component 402a, 402b and field-directing component 404a, 404b are positioned between charger 300 and internal inductive charging assembly 120 of electronic device 100 during a charging event. As shown in FIGS. 5-8, alignment component 402a, 402b and field-directing component 404a, 404b may be positioned within back portion 206 of body 202, adjacent back wall 118 of electronic device 100. Inductive coupling assembly 400, and specifically alignment component 402a, 402b and field-directing component 404a, 404b may be positioned within body 202 of protective case 200 using any suitable manufacturing method. In a non-limiting example, the material forming body 202 of protective case 200 may be injection molded on and/or around alignment component 402a, 402b and field-directing component 404a, 404b and subsequently cured to form protective case 200 including inductive coupling assembly 400.

When charger 300 is positioned on protective case 200 to charge electronic device 100, inductive coupling assembly 400 may be substantially aligned and/or in electrical communication with the various components in electronic device 100 and charger 300. As shown in FIGS. 5-8, alignment component 402a, 402b may be magnetically attracted to and/or magnetically coupled to alignment magnet 124 of internal inductive charging assembly 120 of electronic device 100 and alignment magnet 308 of charger 300. This magnetic attraction and/or coupling between alignment component 402a, 402b and alignment magnets 124 and 308 may also aid in coupling charger 300 to protective case 200 and/or electronic device 100, as discussed herein. Alignment component 402a, 402b may be formed from any of a number of materials and may be formed from multiple materials.

In addition to being magnetically attracted and/or magnetically coupled, alignment component 402a, 402b may be substantially aligned with alignment magnet 124 of electronic device 100 and alignment magnet 308 of charger 300.

As a result of the alignment between alignment component 402a, 402b and alignment magnets 124, 308, as shown in FIGS. 5-8, field-directing component 404a, 404b may be in alignment with receive inductive coil 122 of electronic device 100 and transmit inductive coil 304 of charger 300, respectively. As similarly discussed herein, by aligning receive inductive coil 122, transmit inductive coil 304 and field-directing component 404a, 404b, power may be more effectively transmitted from transmit inductive coil 304 to receive inductive coil 122, using field-directing component 404a, 404b. Similar to alignment component 402a, 402b, field-directing component 404a, 404b may be formed from a variety of materials.

Figure 5:
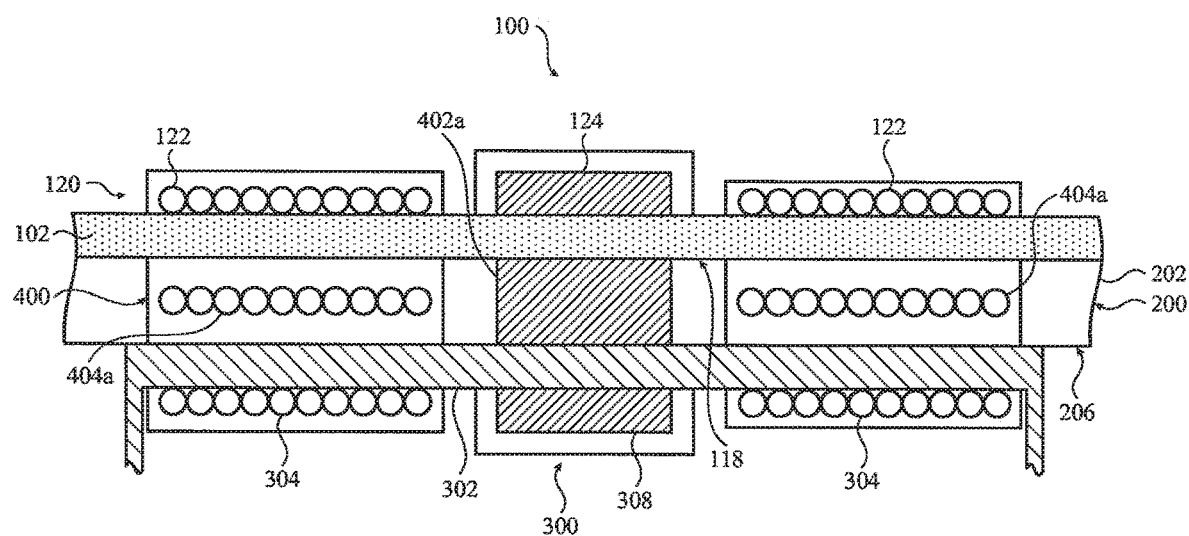
FIG. 5 shows a cross-sectional view of a portion of the electronic device, a protective case including an inductive coupling assembly positioned therein, and the charger, taken along line 4-4 in FIG. 3, according to embodiments. The inductive coupling assembly positioned in the protective case includes a magnet and an inductive repeater coil.

In a non-limiting example shown in FIG. 5, alignment component 402a may be formed from a magnet. Where alignment component 402a is formed from a magnet, alignment component 402a and alignment magnets 124, 308 may each produce a magnetic field that may magnetically attract an adjacent component. As such, alignment component 402a and alignment magnets 124, 308 may all be coupled together based on the distinct magnetic fields produced by each component.

Additionally as shown in the non-limiting example of FIG. 5, field-directing component 404a may be formed as a repeater inductive coil. The repeater inductive coil forming field-directing component 404a may be configured and/or formed from similar material as receive inductive coil 122 of electronic device 100. Where field-directing component 404a is formed as a repeater inductive coil, field-directing component 404a may receive the transmitted power from transmit inductive coil 304 of charger 300 and may repeat the transmission to receive inductive coil 122 of electronic device 100. In the non-limiting example, transmit inductive coil 304 may pulse and provide an inductive power transmission to the repeater inductive coil forming field-directing component 404a when charging the battery of electronic device 100. The repeater inductive coil forming field-directing component 404a may receive the inductive power transmission from transmit inductive coil 304 and may produce a distinct pulse to provide an inductive power transmission to receive inductive coil 122 of electronic device 100. Receive inductive coil 122 may receive the inductive power transmission from repeater inductive coil forming field-directing component 404a, and may subsequently provide the power to electronic device 100 for charging the battery.

Figure 6:
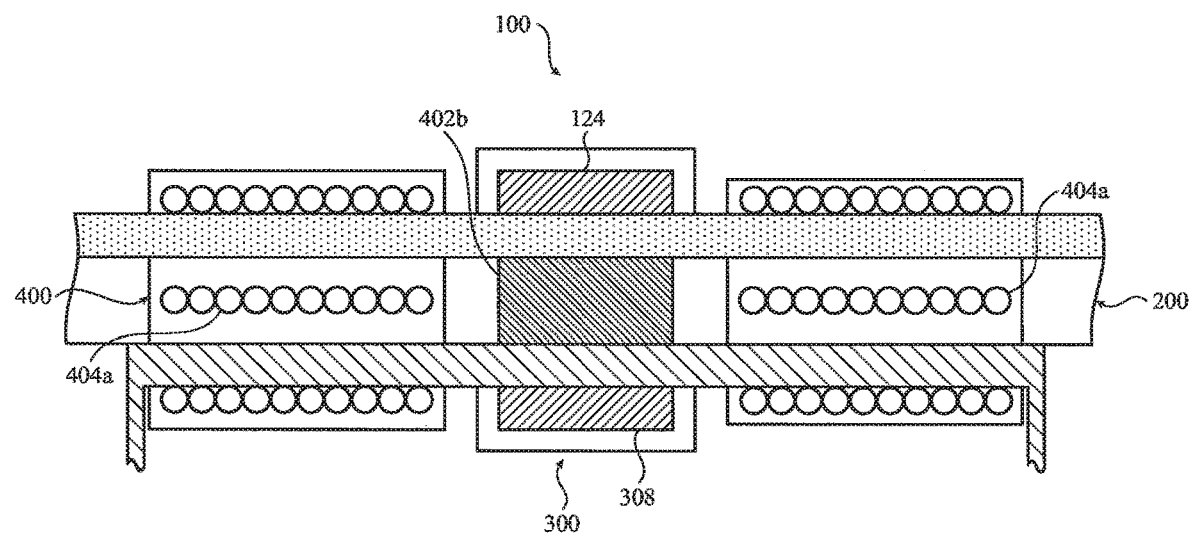
FIG. 6 shows a cross-sectional view of a portion of the electronic device, a protective case including an inductive coupling assembly positioned therein, and the charger, taken along line 4-4 in FIG. 3, according to additional embodiments. The inductive coupling assembly positioned in the protective case includes a magnet material and an inductive repeater coil.

In a non-limiting example shown in FIG. 6, alignment component 402b may be formed from a magnetic material or a material having magnetic properties, such as a ferrite material. Where alignment component 402b is formed from a magnetic material such as a ferrite material, alignment magnets 124, 308 may each produce a magnetic field, and alignment component 402b may not. However, as a result of the magnetic properties of the magnetic material forming alignment component 402b and the positioning of alignment component 402b within protective case 200, alignment component 402b may be magnetically coupled to alignment magnet 124 of electronic device 100 and alignment magnets 308 of charger 300. Alignment component 402b may be magnetically coupled to alignment magnets 124, 308 as a result of the respective magnetic fields generated by alignment magnets 124, 308, and the magnetic properties of alignment component 402b.

Field-directing component 404a, as shown in FIG. 6, may be formed as a repeater inductive coil, similar to that of the non-limiting example shown in FIG. 5. Field-directing component 404a of inductive coupling assembly 400, as shown in FIG. 6, may be formed from the same material and/or function substantially similar to field-directing component 404a shown and discussed herein with respect to FIG. 5. Redundant explanation of the component is omitted herein for clarity.

Figure 7:
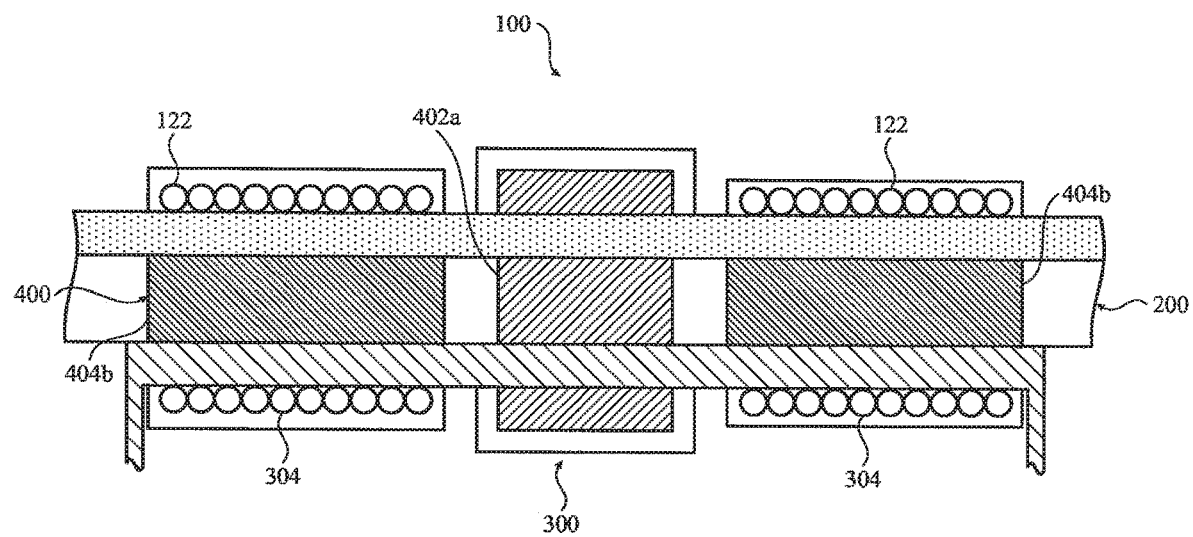
FIG. 7 shows a cross-sectional view of a portion of the electronic device, a protective case including an inductive coupling assembly positioned therein, and the charger, taken along line 4-4 in FIG. 3, according to further embodiments. The inductive coupling assembly positioned in the protective case includes a magnet and a flux transfer component.

In a non-limiting example shown in FIG. 7, alignment component 402a of inductive coupling assembly 400 may be formed from a magnet. Alignment component 402a, formed from a magnet in the non-limiting example shown in FIG. 7, may be substantially similar to the alignment component 402a shown and discussed herein with respect to FIG. 5.

Additionally as shown in FIG. 7, field-directing component 404b may be formed as a flux-transfer component. The flux-transfer component forming field-directing component 404b may be formed from a material having high permeability to an inductive field, such as a ferrite material. Where field-directing component 404b is formed from a flux-transfer component, the inductive power transmission provided by transmit inductive coil 304 may be relayed or passed to receive inductive coil 122 of electronic device 100 through field-directing component 404b. As a result of field-directing component 404b being formed from a material having a high permeability to an inductive field (e.g., ferrite material), field-directing component 404b may act as a conduit for directing inductive power from the transmit inductive coil 304 to the receive inductive coil 122. Dissimilar to the repeater inductive coil (see, FIGS. 5 and 6), when field-directing component 404b is a flux-transfer component, field-directing component 404b may not produce a distinct inductive field. Rather, field-directing component 404b may aid in transmitting the inductive field generated by transmit inductive coil 304 of charger 300 to receive inductive coil 122 of electronic device 100.

Figure 8:
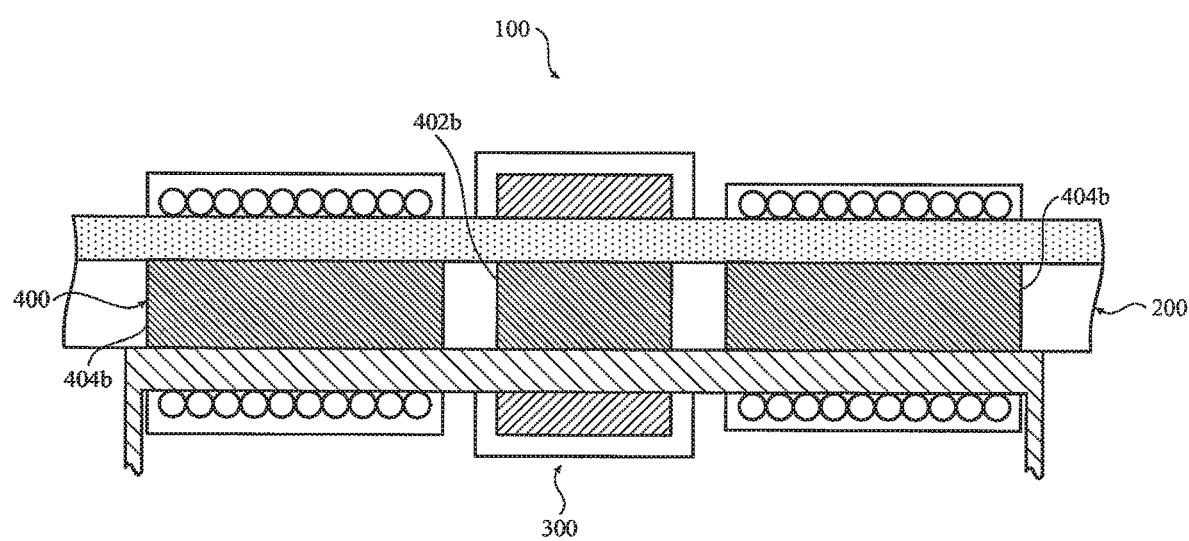
FIG. 8 shows a cross-sectional view of a portion of the electronic device, a protective case including an inductive coupling assembly positioned therein, and the charger, taken along line 4-4 in FIG. 3, according to another embodiment. The inductive coupling assembly positioned in the protective case includes a magnet material and a flux transfer component.

FIG. 8 depicts the alignment component 402b formed from a magnetic material or a material having magnetic properties, and the field-directing component 404b formed as a flux-transfer component. The alignment component 402b in the non-limiting example shown in FIG. 8 may be substantially similar to the alignment component 402b shown and discussed herein with respect to FIG. 5. Additionally, the field-directing component 404b in the non-limiting example shown in FIG. 8 may be substantially similar to the field-directing component 404b shown and discussed herein with respect to FIG. 7. It is understood that each of the alignment component 402b and the field-directing component 404b shown in FIG. 8 may be formed from the same material and/or may function in a substantially similar fashion as discussed herein.

Figure 9:
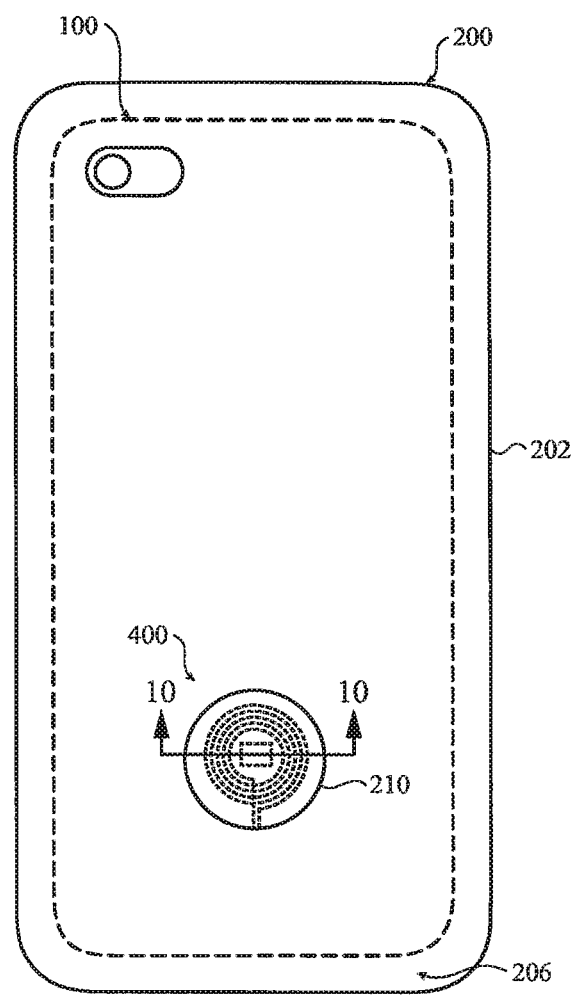
FIG. 9 shows a back view of an electronic device and a protective case, according to further embodiments.

FIG. 9 shows a back view of another non-limiting example of protective case 200. In the non-limiting example, back portion 206 of body 202 may include a recess 210. As shown in FIG. 9, recess 210 may be formed within back portion 206 of body 202 in alignment with inductive coupling assembly 400 positioned within body 202 of protective case 200. As discussed herein, recess 210 may receive charger 300 when charging electronic device 100 positioned within protective case 200.

Figure 10:
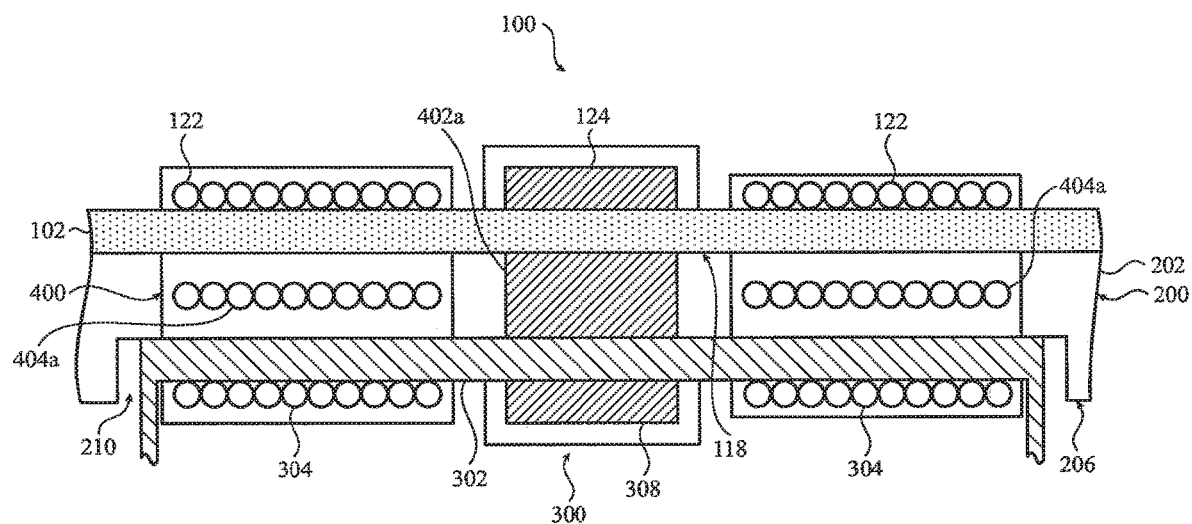
FIG. 10 shows a cross-sectional view of a portion of the electronic device, the protective case, and the charger, taken along line 10-10 in FIG. 9, according to embodiments.

FIG. 10 shows a cross-sectional view of a portion of the non-limiting example embodiment of protective case 200 shown in FIG. 9. As shown in FIG. 10, recess 210 may be formed partially through back portion 206 of body 202, adjacent to inductive coupling assembly 400. Additionally, recess 210 may be formed in alignment with internal inductive charging assembly 120 of electronic device 100. As shown in FIG. 10, and with reference to FIG. 9, recess 210 formed in body 202 may have a diameter that may be larger than the diameter of inductive coupling assembly 400 and internal inductive charging assembly 120 of electronic device 100. The diameter of recess 210 may also be substantially the same size as the diameter of contact plate 302 of charger 300. Recess 210 may include such a diameter to allow contact plate 302 of charger 300 to be positioned within recess 210 of protective case 200 and aligned with inductive coupling assembly 400 and internal inductive charging assembly 120, respectively. The diameter of recess 210 may also secure contact plate 302 to protective case 200 by a compression or retention fit when charger 300 is utilized to charge the battery of electronic device 100 through inductive coupling assembly 400 and internal inductive charging assembly 120 of electronic device 100. In another non-limiting example recess 210 may include a releasable feature for releasably coupling contact plate 302 to protective case 200 within recess 210.

Figure 11:
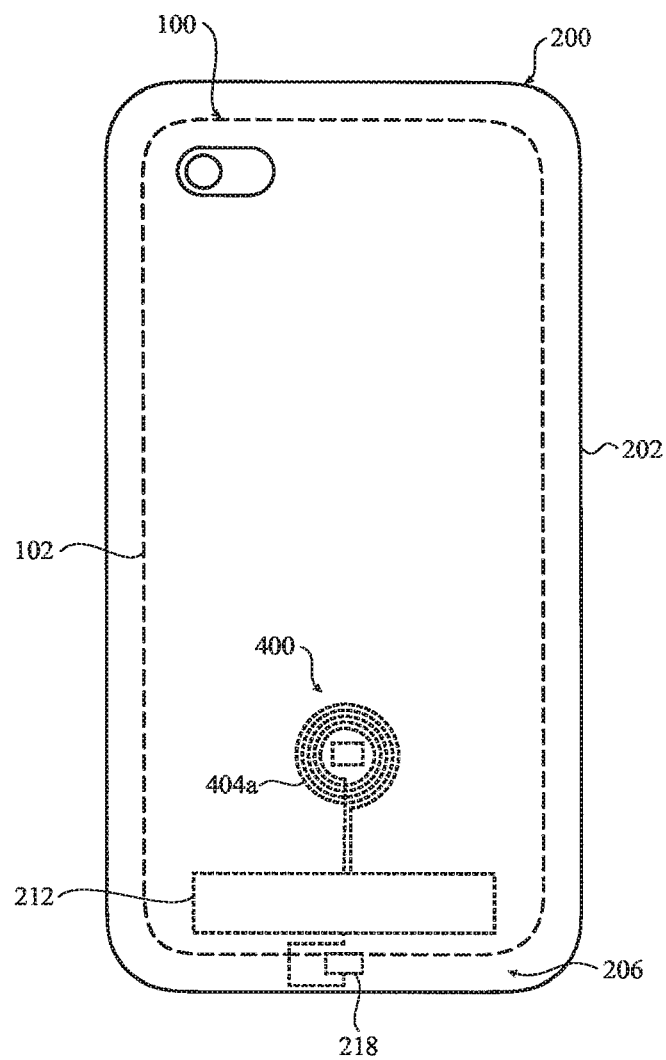
FIG. 11 shows a back view of an electronic device and a protective case, according to another embodiment.

FIG. 11 shows a back view of an additional non-limiting example of protective case 200. As shown in the example embodiment, protective case 200 may also include a case battery 212. Case battery 212 may be formed or positioned within body 202, as similarly discussed herein with respect to inductive coupling assembly 400. In a non-limiting example, case battery 212 may be positioned into back portion 206 of body 202, such that case battery 212 may not be exposed when positioned within protective case 200. As shown in FIG. 11, field-directing component 404a may be in electrical communication with case battery 212 of protective case 200. Field-directing component 404a may be in electrical communication with case battery 212 to provide power to and/or increase a charge in case battery 212 of protective case 200. Case battery 212 of protective case 200 may be distinct and separate from the battery (not shown) of electronic device 100.

As shown in FIG. 11, case battery 212 may also be in electrical communication within electronic device 100. In a non-limiting example, case battery 212 may be in electrical communication with a charging connector 218 positioned or formed, at least partially, in body 202. Charging connector 218 may be any suitable component which may be in electrical communication with electronic device 100 for providing power from case battery 212 to the battery (not shown) of electronic device 100. In a non-limiting example, charging connector 218 of protective case 200 may be a port charger positioned within and in electrical communication with a lightning opening (not shown) formed in or positioned on the electronic device 100. As shown in FIG. 11, when electronic device 100 is positioned within body 202 of protective case 200, electronic device 100 may be coupled to and electrically connected to charging connector 218 of protective case 200.

When charging electronic device 100 using charger 300, as discussed herein, inductive coupling assembly 400 may "leak," or redirect a portion of the power transmitted from transmit inductive coil 304 of charger 300 to case battery 212. The inductive coupling assembly 400 may provide the remainder of the power transmitted from transmit inductive coil 304 to internal inductive charging assembly 120 of electronic device 100 for charging the battery (not shown) of electronic device 100, as discussed herein. By leaking or redirecting a portion of the power to case battery 212 of protective case 200, case battery 212 may provide an auxiliary or back-up battery for electronic device 100. As such, when the battery of electronic device 100 is low on charge and cannot be charged using charger 300, the power in case battery 212 may be depleted to increase charge of the battery of electronic device 100.

Figure 12:
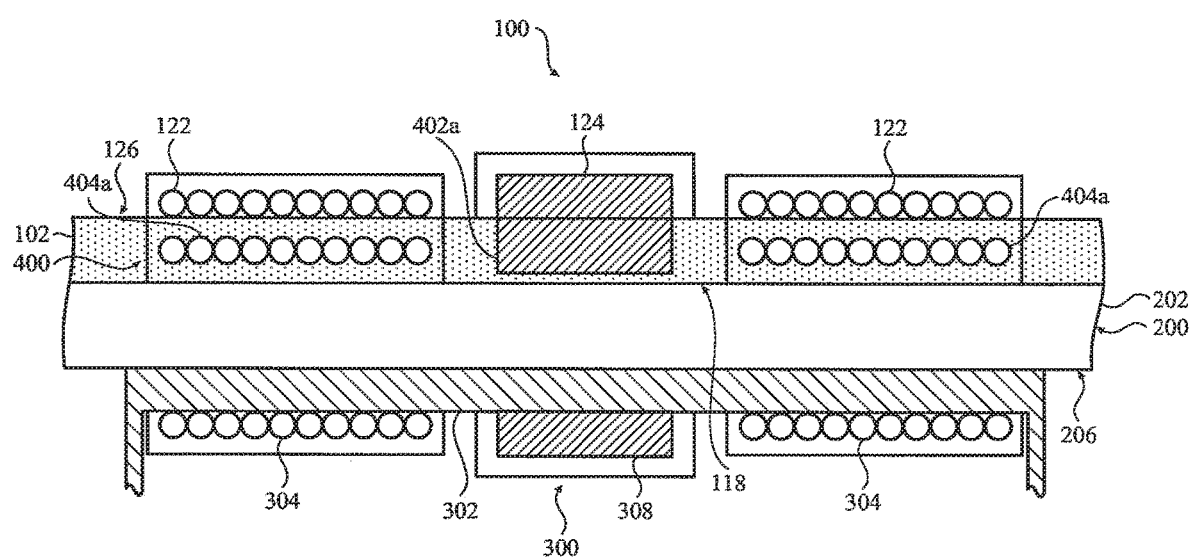
FIG. 12 shows a cross-sectional view of a portion of an electronic device, an inductive coupling assembly, a protective case, and a charger, taken along line 4-4 in FIG. 3, according to additional embodiments.

FIG. 12 shows a side cross-sectional view of another non-limiting example of inductive coupling assembly 400.

As shown in FIG. 12, inductive coupling assembly 400 may be positioned within enclosure 102 of electronic device 100. Inductive coupling assembly 400 may be positioned within enclosure 102, between back wall 118 and an interior surface 126 of enclosure 102. Inductive coupling assembly 400 may be positioned within enclosure 102 in a substantially similar manner as discussed herein with respect to protective case 200.

As shown in FIG. 12 and discussed herein, inductive coupling assembly 400 may be positioned adjacent and/or substantially aligned with internal inductive charging assembly 120 of electronic device 100. That is, alignment component 402a may be aligned with and magnetically coupled to alignment magnet 124 of electronic device 100. Additionally, as a result of the alignment between alignment component 402a and alignment magnet 124, field-directing component 404a may be aligned with and in electrical communication with receive inductive coil 122 of internal inductive charging assembly 120 of electronic device 100.

Electronic device 100, as shown in FIG. 12 may also be covered and/or positioned within protective case 200. When charging electronic device 100, body 202 of protective case 200 may be positioned between inductive coupling assembly 400 and charger 300, as discussed herein. Similar to FIGS. 5-8, inductive coupling assembly 400 may aid in the alignment of charger 300 and internal inductive charging assembly 120 of electronic device 100 and/or may aid in power transmission from transmit inductive coil 304 of charger 300 and receive inductive coil 122 of electronic device 100. Alignment component 402a may be magnetically coupled to and/or attracted to alignment magnets 124, 308, which may aid in coupling charger 300 to protective case 200 and/or electronic device 100 when transmitting power to charge the battery (not shown) of electronic device 100. Additionally, alignment component 402a may be aligned with alignment magnets 124, 308, which may in turn, align transmit inductive coil 304 of charger 300 with receive inductive coil 122 of electronic device 100 and field-directing component 404a of inductive coupling assembly 400. The inclusion of inductive coupling assembly 400 in enclosure 102 may aid in the power transmission as a result of field-directing component 404a redirecting (or repeating) the inductive field from transmit inductive coil 304 to receive inductive coil 122. Additionally, inductive coupling assembly 400 may aid in power transmission by providing an intermediate inductive field transmitter (or repeater) between transmit inductive coil 304 and receive inductive coil 122. The intermediate inductive field transmitter (or repeater) may strengthen, increase and/or improve the power transmitted through protective case 200, prior to the power reaching receive inductive coil 122.

In the non-limiting example shown in FIG. 12, inductive coupling assembly 400 may include alignment component 402a formed as a magnet and field-directing component 404a formed as a repeater inductive coil. However, alignment component 402a and field-directing component 404a of inductive coupling assembly 400, positioned within enclosure 102 of electronic device 100, may be formed from a plurality of materials, as similarly discussed herein with respect to FIGS. 5-8. In another non-limiting example (not shown), alignment component 402a may be formed from a magnetic material or a material having magnetic properties, such as a ferrite material, and field-directing component 404a may be formed as a flux-transfer component. The flux-transfer component forming field-directing component 404a may be formed from a material having high permeability to an inductive field, such as a ferrite material. In further non-limiting examples, alignment component 402a and field-directing component 404a may be formed from any combination of materials discussed herein.

Figure 13:
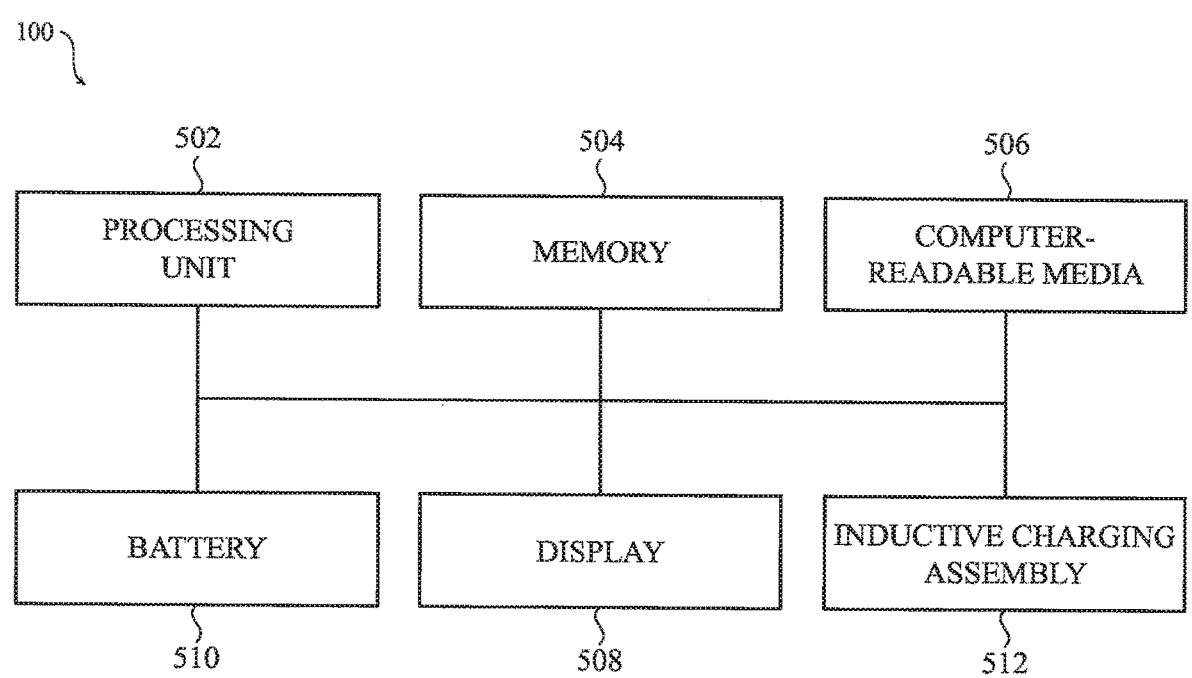
FIG. 13 shows a system diagram of the electronic device of FIGS. 1A-1C, according to embodiments.

FIG. 13 depicts an example electronic device having a battery and an internal inductive charging assembly. The schematic representation depicted in FIG. 13 may correspond to components of the portable electronic devices described above, including electronic device 100 depicted in FIGS. 1A-12. However, FIG. 13 may also more generally represent other types of devices that are configured to use an inductive charging assembly.

As shown in FIG. 13, electronic device 100 includes a processing unit 502 operatively connected to computer memory 504 and computer-readable media 506. Processing unit 502 may be operatively connected to memory 504 and computer-readable media 506 components via an electronic bus or bridge. Processing unit 502 may include one or more computer processors or microcontrollers that are configured to perform operations in response to computer-readable instructions. Processing unit 502 may include the central processing unit (CPU) of the device. Additionally or alternatively, processing unit 502 may include other processors within the device including application specific integrated circuit (ASIC) and other microcontroller devices.

Memory 504 may include a variety of types of non-transitory computer-readable storage media, including, for example, read access memory (RAM), read-only memory (ROM), erasable programmable memory (e.g., EPROM and EEPROM), or flash memory. Memory 504 is configured to store computer-readable instructions, sensor values, and other persistent software elements. Computer-readable media 506 also includes a variety of types of non-transitory computer-readable storage media including, for example, a hard-drive storage device, solid state storage device, portable magnetic storage device, or other similar device. Computer-readable media 506 may also be configured to store computer-readable instructions, sensor values, and other persistent software elements.

In this example, processing unit 502 is operable to read computer-readable instructions stored on memory 504 and/or computer-readable media 506. The computer-readable instructions may adapt processing unit 502 to charge the battery using the inductive charging assembly, as described above with respect to FIGS. 1A-12. The computer-readable instructions may be provided as a computer-program product, software application, or the like.

As shown in FIG. 13, electronic device 100 also includes a display 508. Display 508 may include a liquid-crystal display (LCD), organic light emitting diode (OLED) display, light emitting diode (LED) display, or the like. If display 508 is an LCD, the display may also include a backlight component that can be controlled to provide variable levels of display brightness. If display 508 is an OLED or LED type display, the brightness of the display may be controlled by controlling the electrical signal that is provided to display elements.

Electronic device 100 can also include a battery 510. Battery 510 is configured to power the various components of the electronic device including for example, processing unit 502 and display 508. Battery 510 is operatively connected with the various components of the electronic device 100, including inductive charging assembly 512 via an electronic bus or bridge and is configured to receive power from inductive charging assembly 512.

The inductive charging assembly 512 is configured to be in electrical communication with a charger (not shown) of electronic device 100. Specifically, inductive charging assembly 512 may be in electrical communication with a charger to receive power for the charger, and for charging battery 510 of electronic device 100. The inductive charging assembly 512 includes an alignment component and a power receive inductive coil for receiving power and/or inductive field transmitted by a power transmit inductive coil of the charger. Additionally, inductive charging assembly 512 is configured to be in electrical communication with an inductive coupling assembly, as discussed herein, for improving charge efficiency and/or charge time for battery 510.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system comprising:
   a first electronic device comprising:
     an enclosure; and
     an internal inductive charging assembly positioned within the enclosure, and comprising a receive inductive coil;
   a second electronic device comprising a transmit inductive coil configured to be aligned with and in electrical communication with the receive inductive coil; and
   a third electronic device positioned between the receive inductive coil and the transmit inductive coil, the third electronic device comprising:
     a body having a bottom wall and sidewalls extending from the bottom wall defining a cavity for receiving the first electronic device; and
     a flux-transfer component positioned within the bottom wall and formed of a material having high permeability to an inductive field, the flux-transfer component being configured to, when the first electronic device is positioned in the cavity, relay inductive power from the transmit inductive coil to the receive inductive coil.

2. The system of claim 1, wherein:
   the first electronic device further includes a first alignment component;
   the second electronic device further includes a second alignment component; and
   the third electronic device further includes a third alignment component configured to draw the second alignment component into alignment with the first alignment component.

3. The system of claim 1, wherein the flux-transfer component is formed of ferrite.

4. The system of claim 1, wherein the flux-transfer component is a solid structure in the shape of a ring having a single loop.

5. The system of claim 1, wherein the flux-transfer component is a solid structure that extends from a bottom surface of the bottom wall to a top surface of the bottom wall.

6. The system of claim 1, wherein a cross-section of the flux-transfer component includes a rectangular structure.

7. The system of claim 6, wherein the rectangular structure laterally extends from an inner diameter of the receive inductive coil to an outer diameter of the receive inductive coil.

8. A protective case comprising:
   a body having a bottom wall and sidewalls extending from the bottom wall defining a cavity for receiving an electronic device having a receive inductive coil; and
   an inductive coupling assembly positioned at least partially within the bottom wall, the inductive coupling assembly comprising:
   a flux-transfer component positioned within the bottom wall and formed of a material having high permeability to an inductive field, the flux-transfer component being configured to, when the electronic device is positioned in the cavity, relay inductive power from a transmit inductive coil to the receive inductive coil.

9. The protective case of claim 8, wherein:
   the flux-transfer component is configured to be in electrical communication with the receive inductive coil; and
   the transmit inductive coil is housed within an external charger.

10. The protective case of claim 9, wherein:
    the body comprises a recess formed adjacent to the inductive coupling assembly; and
    the recess is configured to receive the external charger for the electronic device and align a transmit inductive coil of the charger with the flux-transfer component of the inductive coupling assembly.

11. The protective case of claim 9, further comprising a battery positioned within the body.

12. The protective case of claim 11, wherein the battery is in electrical communication with the electronic device.

13. The protective case of claim 9, wherein the flux-transfer component is a solid structure that extends from a bottom surface of the bottom wall to a top surface of the bottom wall.

14. A system comprising:
    a first electronic device comprising:
      an enclosure; and
      an internal inductive charging assembly positioned within the enclosure, and comprising a receive inductive coil; and
    a second electronic device comprising:
      a body having a bottom wall and sidewalls extending from the bottom wall defining a cavity for receiving the first electronic device; and
      a flux-transfer component embedded within the bottom wall and formed of a material having high permeability to an inductive field, the flux-transfer component being configured to, when the first electronic device is positioned in the cavity, relay inductive power from a transmit inductive coil of a third electronic device to the receive inductive coil.

15. The system of claim 14, wherein the flux-transfer component is molded within the bottom wall of the body.

16. The system of claim 14, wherein the internal inductive charging assembly is configured to electrically communicate with an external charger positioned adjacent the body of the second electronic device.

17. The system of claim 16, wherein the charger is configured to be in electrical communication with the flux-transfer component.

18. The system of claim 14, wherein:
    the first electronic device includes a battery positioned within the enclosure; and the battery is in electrical communication with the receive inductive coil.

19. The system of claim 18, wherein the second electronic device includes a second electronic device battery operatively coupled to the battery of the first electronic device.

20. The system of claim 14, wherein the flux-transfer component is a solid structure that extends from a bottom surface of the bottom wall to a top surface of the bottom wall.

* * * * *